United States Patent
Sun

(10) Patent No.: US 8,922,701 B2
(45) Date of Patent: Dec. 30, 2014

(54) AUXILIARY FOCUSING SYSTEM AND FOCUSING METHOD

(71) Applicant: Ingrasys Technology Inc., Taoyuan (TW)

(72) Inventor: Yu-Hung Sun, Taoyuan (TW)

(73) Assignee: Ingrasys Technology Inc., Taoyuan (TW)

( * ) Notice: Subject to any disclaimer, the term of this patent is extended or adjusted under 35 U.S.C. 154(b) by 0 days.

(21) Appl. No.: 13/740,174

(22) Filed: Jan. 12, 2013

(65) Prior Publication Data

US 2013/0278815 A1   Oct. 24, 2013

(30) Foreign Application Priority Data

Apr. 18, 2012   (TW) .............................. 101113870 A

(51) Int. Cl.
   *H04N 5/232*   (2006.01)
(52) U.S. Cl.
   CPC ................................. *H04N 5/23212* (2013.01)
   USPC .......................................................... 348/345
(58) Field of Classification Search
   USPC .................... 348/345, 349, 353, 354
   See application file for complete search history.

(56) References Cited

U.S. PATENT DOCUMENTS

| | | | | |
|---|---|---|---|---|
| 7,911,526 B2 * | 3/2011 | Kageyama | ..................... | 348/349 |
| 8,605,201 B2 * | 12/2013 | Hongu | ........................... | 348/345 |
| 8,643,770 B2 * | 2/2014 | Cote et al. | ..................... | 348/371 |
| 2001/0035910 A1 * | 11/2001 | Yukawa et al. | ............... | 348/349 |
| 2008/0267601 A1 * | 10/2008 | Kobayashi | ....................... | 396/91 |
| 2010/0039532 A1 * | 2/2010 | Galstian et al. | .......... | 348/231.99 |

FOREIGN PATENT DOCUMENTS

| TW | 200706905 A | 8/2005 |
|---|---|---|
| TW | 200736807 A | 3/2006 |

* cited by examiner

*Primary Examiner* — James Hannett
(74) *Attorney, Agent, or Firm* — Novak Druce Connolly Bove + Quigg LLP

(57) ABSTRACT

A focusing method for a camera by adjusting the focal length from a minimum focal length to a maximum focal length. Obtaining a number of first image definitions for analysis and comparing the first definitions to obtain a greatest definition in the first definitions. When the camera is adjusted for obtaining a second definition, obtaining a number of second image definitions for analysis. Comparing the second definition with the greatest definition and outputting a first informing signal if the second definition is less than the greatest definition. Informing the user that the camera needs to be adjusted and outputting a second informing signal when the second definition is equal to the greatest definition and informing the user that further adjustment is not required.

6 Claims, 2 Drawing Sheets

AUXILIARY FOCUSING SYSTEM AND FOCUSING METHOD

BACKGROUND

1. Technical Field

The present disclosure relates to an auxiliary system and a method for focusing a camera.

2. Description of Related Art

When installing a surveillance camera, two operators are needed for tuning the lens focus. One person adjusts the focus rod of camera lens, and the other person checks a video from the camera. When the clarity of the video meets a requirement, then the operators stop tuning the lens. This focus tuning process is troublesome.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
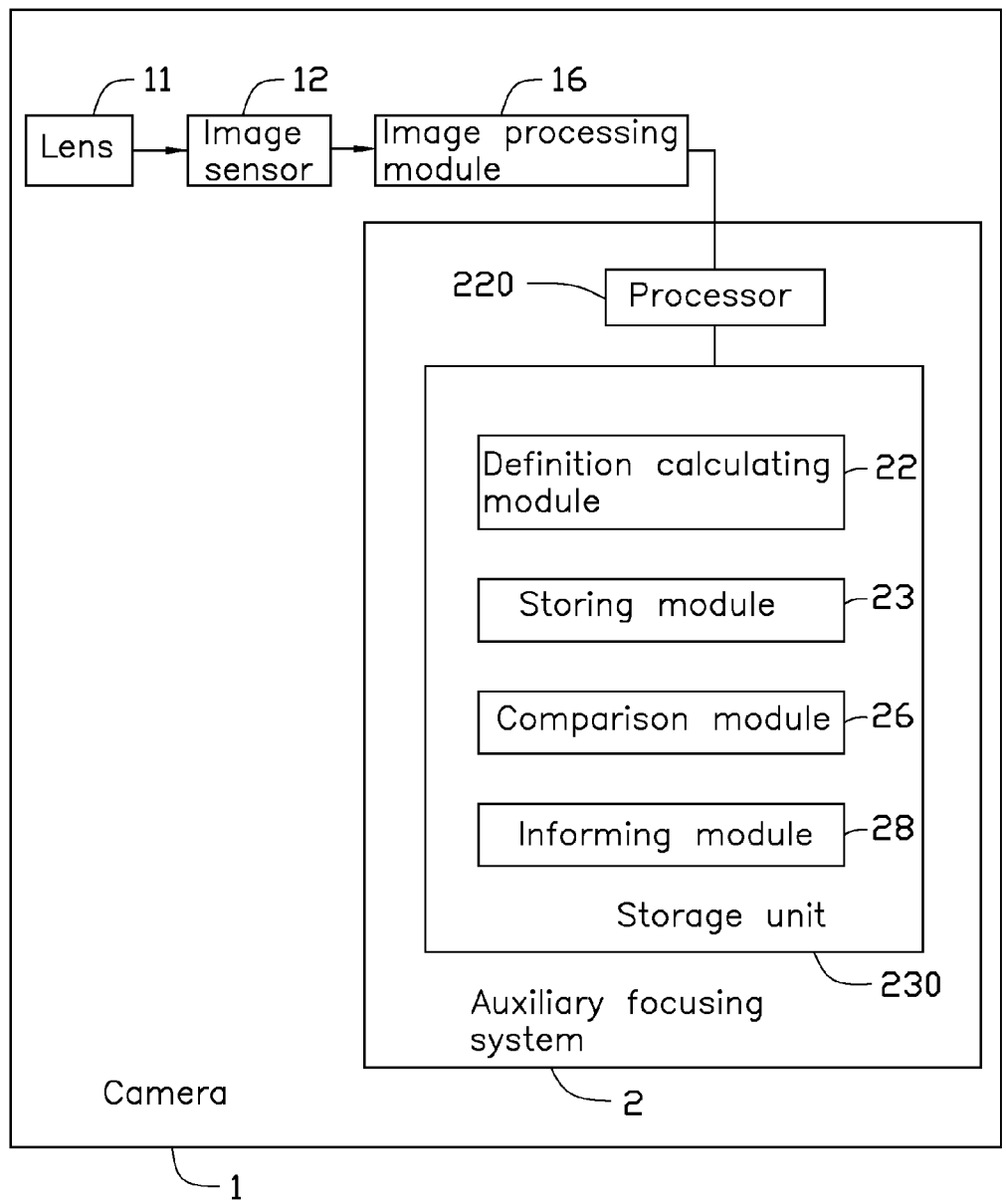
FIG. 1 is a block diagram of an exemplary embodiment of an auxiliary focusing system for a camera.

Referring to FIG. 1, an embodiment of an auxiliary focusing system 2 for a camera 1 is shown. The camera 1 includes a lens 11, an image sensor 12, and an image processing module 16. A focal length of the lens 11 can be adjusted to change the definition of images obtained by the camera 1. The lens 11 gathers light reflected from a scene. The image sensor 12 converts the gathered light to digital signals. The image processing module 16 processes the digital signals from the image sensor 12, and creates images according to the processed digital signals.

The auxiliary focusing system 2 includes a processor 220 and a storage unit 230. The storage unit 230 includes a definition calculating module 22, a storing module 23, a comparison module 26, and an informing module 28, which may include one or more computerized instructions executed by the processor 220.

The definition calculating module 22 receives the images from the image processing module 16, and calculates the definition of each image. The definitions of the images are stored in the storing module 23. Generally speaking, when an operator installs a camera, the operator first adjusts the focal length of the lens 11 of the camera, from a minimum focal length to a maximum focal length. Thus, the definition calculating module 22 obtains a plurality of first definitions. The first definitions are stored in the storing module 23.

The comparison module 26 compares the first definitions stored in the storing module 23 to obtain the greatest definition in the first definitions.

In the embodiment, an initial position of the lens 11 is zero degrees of rotation, and the lens 11 is adjustable in increments of five degrees of rotation. When the lens 11 is in the initial position, the definition calculating module 22 obtains a first adjustment definition. The first adjustment definition is stored in the storing module 23. The comparison module 26 compares the first adjustment definition with the greatest definition. If the first adjustment definition is less than the greatest definition, the comparison module 26 outputs an informing signal to the informing module 28, such that the informing module 28 informs the operator that the lens 11 of the camera 1 needs to be adjusted. When the lens is rotated by five degrees, the definition calculating module 22 obtains a second adjustment definition. The second adjustment definition is stored in the storing module 23. The comparison module 26 compares the second adjustment definition with the greatest definition. If the second adjustment definition is less than the greatest definition, the comparison module 26 further compares the second adjustment definition with the first adjustment definition. If the second adjustment definition is less than the first adjustment definition, the comparison module 26 outputs an informing signal to the informing module 28, to cause the informing module 28 to inform the operator that the rotation orientation is wrong. If the second adjustment definition is not less than the first adjustment definition, the comparison module 26 outputs an informing signal to the informing module 28, to cause the informing module 28 to inform the operator that the rotation orientation is correct. In the embodiment, the informing module 28 informs the operator by an audible or visual signal.

If the second adjustment definition is equal to the greatest definition, the comparison module 26 outputs an informing signal to the informing module 28, to cause the informing module 28 to inform the operator that no further adjustment of the camera 1 is required.

Figure 2:
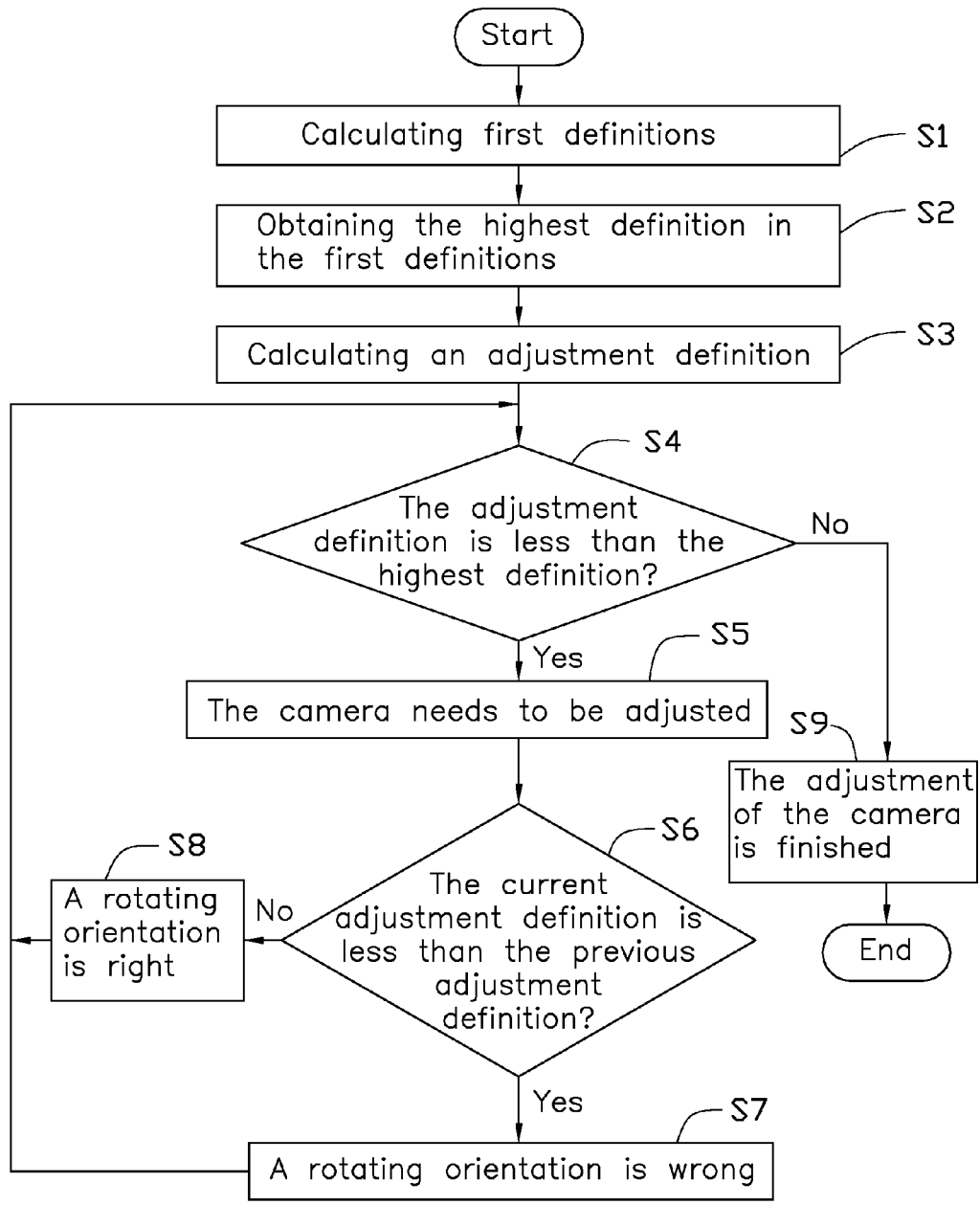
FIG. 2 is a flowchart of an exemplary embodiment of a focusing method for a camera.

FIG. 2 shows a focusing method for the camera 1, the focusing method includes the following steps.

In step S1, the definition calculating module 22 receives images from the image processing module 16, and calculates a definition of each image. The definitions of the images are stored in the storing module 23. In the embodiment, when an operator installs a camera, the operator first adjusts the focal length of the camera from a minimum focal length to a maximum focal length. Thus, the definition calculating module 22 obtains a plurality of first definitions. The first definitions are stored in the storing module 23.

In step S2, the comparison module 26 compares the first definitions stored in the storing module 23 to obtain the greatest definition in the first definitions. After this, the operator slowly rotates the lens 11 of the camera 1.

In step S3, the definition calculating module 22 receives an image from the image processing module 16 after the lens 11 has been rotated to a different position, and calculates an adjustment definition of the image.

In step S4, the comparison module 26 compares the adjustment definition with the greatest definition. If the adjustment definition is less than the greatest definition, the process goes to step S5. If the adjustment definition is equal to the greatest definition, the process goes to step S9.

In step S5, the comparison module 26 outputs an informing signal to the informing module 28, to cause the informing module 28 to inform the operator that the lens 11 of the camera 1 needs to be adjusted.

In step S6, the comparison module 26 compares the current adjustment definition with a previous adjustment definition. If the current adjustment definition is less than the previous adjustment definition, the process goes to step S7. If the current adjustment definition is not less than the previous adjustment definition, the process goes to step S8.

In step S7, the comparison module 26 outputs an informing signal to the informing module 28, to cause the informing module 28 to inform the operator that the rotating orientation of the lens is wrong. The process returns to step S4.

In step S8, the comparison module 26 outputs an informing signal to the informing module 28, to cause the informing module 28 to inform the operator that the rotating orientation of the lens is correct, and the process returns to step S4.

In step S9, the comparison module 26 outputs an informing signal to the informing module 28, to cause the informing module 28 to inform the operator that no further adjustment of the camera 1 is required.

The foregoing description of the embodiments of the disclosure has been presented only for the purposes of illustration and description and is not intended to be exhaustive or to limit the disclosure to the precise forms disclosed. Many modifications and variations are possible in light of the above disclosure. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than by the foregoing description and the exemplary embodiments described therein.

What is claimed is:

1. An auxiliary focusing system for a camera, comprising:
   a processor; and
   a storage unit connected to the processor, and storing a plurality of programs to be executed by the processor, wherein the storage unit stores:
   a definition calculating module to calculate definitions of each image of a plurality of images during a focus length of the camera being adjusted from a minimum focal length to a maximum focal length for obtaining a plurality of first definitions, and to calculate a definition of one of the plurality of images when the camera is adjusted for obtaining a second definition;
   a storing module to store the first definitions and the second definition;
   a comparison module to compare the first definitions stored in the storing module to obtain a greatest definition in the first definitions, wherein the comparison module further compares the second definition with the greatest definition, when the second definition is less than the greatest definition, the comparison module outputs a first informing signal, when the second definition is equal to the greatest definition, the comparison module outputs a second informing signal; and
   an informing module to inform that the camera needs to be adjusted in response to receiving the first informing signal, and to inform that the camera needs not be adjusted in response to receiving the second informing signal.

2. The auxiliary focusing system of claim 1, wherein the comparison module further compares a current second definition with a previous second definition in response to the second definition being less than the greatest definition, the comparison module outputs a third informing signal in response to the current second definition being less than the previous second definition; the informing module further informs that a rotating orientation of the camera is wrong in response to receiving the third informing signal.

3. The auxiliary focusing system of claim 1, wherein the comparison module further compares a current second definition with a previous second definition in response to the second definition being less than the greatest definition, the comparison module outputs a fourth informing signal in response to the current second definition being not less than the previous second definition; the informing module further informs that a rotating orientation of the camera is correct in response to receiving the fourth informing signal.

4. A focusing method for a camera, comprising:
   calculating definitions of each image of a plurality of images during a focus length of the camera being adjusted from a minimum focal length to a maximum focal length for obtaining a plurality of first definitions;
   comparing the first definitions to obtain a greatest definition in the first definitions;
   calculating a definition of one of the plurality of images when the camera is adjusted for obtaining a second definition;
   comparing the second definition with the greatest definition;
   outputting a first informing signal in response to the second definition being less than the greatest definition;
   informing that the camera needs to be adjusted;
   outputting a second informing signal in response to the second definition being equal to the greatest definition; and
   informing that the camera needs not to be adjusted.

5. The focusing method of claim 4, after the step "informing that the camera needs to be adjusted" further comprising:
   comparing a current second definition with a previous second definition;
   outputting a third informing signal in response to the current second definition being less than the previous second definition; and
   informing that a rotating orientation of the camera is wrong in response to receiving the third informing signal.

6. The focusing method of claim 4, after the step "informing that the camera needs to be adjusted" further comprising:
   comparing a current second definition with a previous second definition;
   outputting a fourth informing signal in response to the current second definition being not less than the previous second definition; and
   informing that a rotating orientation of the camera is right in response to receiving the fourth informing signal.

* * * * *